Patented Feb. 28, 1939

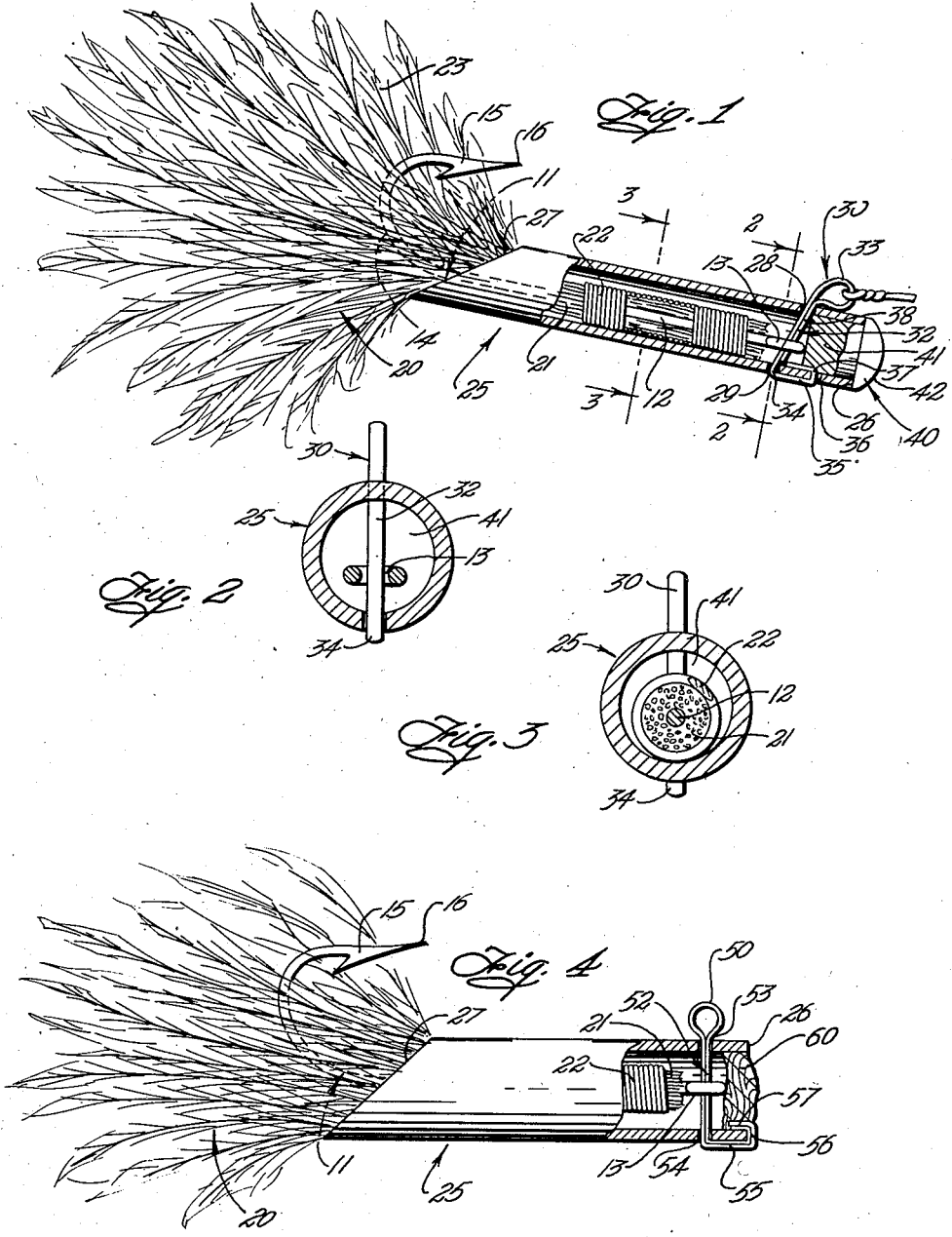

2,148,784

UNITED STATES PATENT OFFICE 2,148,784

FISH LURE

Ray Stewart and Charles S. Fish, Los Angeles, Calif.

Application August 16, 1938, Serial No. 225,172

8 Claims. (Cl. 43—42)

Our invention relates to a fish lure of a type in which the hook is partly obscured by feathers forming a hackle and in which there is a slight vibratory or oscillating motion given to the hook as it is pulled through the water or held by a line in a flowing stream. Our invention also is in the line of fish lures having preferably a brilliant or shiny device associated with the hook to attract the fish.

An object and feature of our invention in fish lures includes a fish hook in which feathers, the tips of which form the hackle, are attached to the shank or stem of the hook, that is, by the ribs of the feathers being wound to such stem. With this type of hook we form a metal or similar covering for the stem and the bound feathers through the medium of a cylindrical sleeve. Such sleeve made of a small tube preferably shiny on the outside surface is fitted over the stem of the hook, the binding of the feathers and the eye of the hook.

Another object and feature of our invention is providing a somewhat loose fitted connection between the eye and the tubular sleeve so that the hook may have a slight wobbling or oscillating motion in reference to the encasing sleeve. Therefore, by this construction the sleeve is provided with aligned perforations diametrically opposite through which a staple or cotter pin is fitted, the staple or cotter pin engaging the eye of the hook. By this construction the eye of the staple or cotter pin projects from the upper side of the tube-like sleeve and has the leader and fishing line connected thereto. Therefore a further detailed object of our invention is the indirect connection of the fishing line and leader to the hook through the medium of the cotter pin connected to the cylindrical sleeve and thus to the eye of the hook. This allows the eye of the hook to have a slight angular turn so far as the shank of the cotter pin is concerned, also, to allow a slight up and down movement of the eye and stem of the hook in reference to the cotter pin within the diameter of the sleeve.

Further features include details such as the attachment of the cotter pin to the sleeve, the weighting of the forward end of the sleeve by a lead plug or the like or where it is desired to have the forward end light for a small hook, by a filling of plastic wood or the equivalent. Other details provide for beveling the trailing end of the sleeve, the bevel facing the prong of the hook which extends above the sleeve and is obscured by the feather ends forming the hackle.

Our invention is illustrated in connection with the accompanying drawing, in which:

Fig. 1 is a side elevation broken away longitudinally to show the interior construction illustrating the type of lure preferred for large hooks.

Fig. 2 is a transverse section on the line 2—2 of Fig. 1 in the direction of the arrows.

Fig. 3 is a transverse section on the line 3—3 of Fig. 1 in the direction of the arrows.

Fig. 4 is a side elevation broken away longitudinally of another form of assembly designed for lighter weight hooks including a plastic wood plug in the sleeve.

In our invention we employ a hook 11 which may be of a standard type in which the various parts are indicated as the stem 12, the eye 13, the bend 14 of the hook and the prong 15 with the point 16. The hooks are provided with feathers 20 of which the ribs and the coarse part of the feathers are formed into a bundle as indicated at 21 and attached by a binding 22 to the stem of the hook. These feathers are preferably of a type which fluff outwardly at their tips forming a spread hackle 23 which obscures the bend 14 and also somewhat obscures the prong and point of the hook.

The hook with the feathers attached is fitted inside of a cylindrical sleeve 25. Such sleeve is preferably cut transverse at the forward end 26 and has an upwardly facing bevel 27 at the rear end. A pair of inclined upper and lower perforations 28 and 29 are diametrically opposite and through these may be fitted a staple or cotter pin designated 30 engaging the eye of the hook.

In the constructions of Figs. 1 and 4 we illustrate different arrangements for securing the cotter pin or staple. In Fig. 1 the shank 32 of the staple extending from the eye 33 which is on the outside of the sleeve has one leg 34 extending through the perforation 29, a section 35 extending along the outside of the tubular sleeve. There is a second perforation 36 through which the end of the staple is bent inwardly and then has a return bend 37 longitudinally on the inside of the sleeve. The other leg 38 of the cotter pin is cut to terminate inside of the sleeve. With this construction it is desirable to use a quite heavy lead plug illustrated at 40. This plug has an inner plug portion 41 pressed in the end of the cylindrical tube and engaging the inwardly bent end portion 37 of the cotter pin. The plug has a rounded or dome-shaped head 42 which spreads over the end edge 26 of the sleeve.

In the construction of Fig. 4 the cotter pin or staple has an eye 50, the shank 52 extending therefrom through the two perforations 53 and 54 of the sleeve, the shank extends through the eye of the hook and both legs of the shank extend through the perforation 54. The double portion 55 extends longitudinally of the tube and is bent over the forward end 36, this having a reverse bend 56 with the inwardly turned ends 57. In this construction which is designed for a lighter weight hook with a lighter weight at the forward end of the assembly, the front end of the tube is filled with a plug 60 which is preferably plastic wood pressed in place in the open end and confining the ends 57 of the cotter pin.

In both constructions it will therefore be seen that certain characteristics of the invention reside in the cylindrical sleeve in which the stem and eye of the hook is mounted and thus obscured from the view. The sleeve also obscures the binding and the coarse ends of the feathers. The bevel end 27 allows the feathers to spread considerably so that the soft fluffy portion forming the hackle spreads around the bend of the hook proper. We find for the purposes of this type of hook that feathers of a high grade are required and for such purpose import special chicken feathers from China.

By this construction the leader and thus the fishing line is connected to the eye of the cotter pin and not directly to the eye of the hook. In the construction of Fig. 1 the relatively heavy lead plug 40 tends to cause a downward tilt and substantially counter-balances the hook end in reference to the balance from the eye of the cotter pin. In the construction of Fig. 4 using the plastic wood in the forward end of the sleeve, the hook end of the fish hook is much heavier and tends to unbalance the suspension of the lure from the eye 50. However in both constructions the hook may have a lateral wobbling action, the axis of rotation being on the stem 12 of the hook and this being due to the loose fit of the eye of the hook and the cotter pins. This gives a slight movement to the hook when the lure is being pulled through the water by the line or is held stationary in running water. It is obvious that the outside of the sleeve may be quite shiny and for this purpose we find that a bright aluminum sleeve is satisfactory. This may be provided with feathers some of which have color and the forward end of the sleeve may also be painted the same color. An object of having the cotter pin or staple of Fig. 1 inclined is that the drag of the water on the hook and the hackle causes the stem of the hook to lie close to the lower side of the sleeve, therefore the hackle more completely covers the prong of the hook.

It is to be understood that the sleeve may be made of different materials and although we have found that the bright aluminum is most satisfactory, it will be obvious that dull colors may be utilized as well as coloring or painting one or both ends or of the whole sleeve. The sleeve may be made of different materials. It is also obvious that instead of using feathers we may use other material which will give the hackle effect such as yarns, rubber string-like strands, Cellophane or other suitable material. Therefore in the claims where we have used the term sleeves and feathers, we do not wish to be restricted to a specific type of sleeve or necessarily to the use of feathers forming the hackle.

Various changes may be made in the details of the construction without departing from the spirit or scope of the invention as defined by the appended claims.

We claim:

1. A fish lure in which a fish hook having a prong, a bend, a stem and eye is provided with feathers attached to the stem and forming a hackle adjacent the bend of the hook combined with a cylindrical sleeve fitted over the stem of the hook and the feathers secured thereto with the bend of the hook, the prongs and the hackle extending outwardly beyond the trailing end of the sleeve, means to loosely connect the eye of the hook and the sleeve adjacent the forward portion thereof and means to connect a leader and line to the sleeve approximately in alignment with the plane of the prong and the bend of the hook.

2. A fish lure as claimed in claim 1, a plug fitted in the forward end of the sleeve and positioned forwardly of the eye of the hook.

3. A fish lure as claimed in claim 1, the means to loosely connect the sleeve and the eye of the hook comprising the sleeve having diametrically opposite openings, the pin extending through said openings and through the eye and having a reverse bent portion, a plug in the forward end of the sleeve engaging the reverse bent portion of the pin, said plug being forward of the eye of the hook.

4. A fish lure having a hook with a prong, a bend, a straight stem and an eye at its forward end combined with a tubular sleeve having a pair of diametrical perforations and fitted over the eye and the stem of the hook, a cotter pin extending through the perforations and the eye of the hook and having a loose fit with the eye of the hook, feathers secured to the stem of the hook and extending outwardly through the rear end of the sleeve and forming a hackle adjacent the bend and the prong of the hook.

5. A fish lure as claimed in claim 4, the cotter pin having an external eye substantially in alignment with the plane of the prong and the bend of the hook, such eye being adapted for attachment of a leader and fishing line, the opposite end of the cotter pin having a reversely bent end, a plug inserted in the forward end of the sleeve and engaging the bent end of the cotter pin, the plug being positioned forwardly of the eye of the hook.

6. A fish lure as claimed in claim 4, the sleeve having a third perforation on its underside forward of the diametrically opposite perforations, the cotter pin having one prong extending longitudinally along the bottom of the sleeve and having a reverse bent end portion extending inwardly through the third perforation and a plug at the forward end of the sleeve forming a closure therefor and engaging the end portion of the prong of the cotter pin forward of the eye of the hook.

7. A fish lure as claimed in claim 4, the cotter pin having the ends extending beyond the bottom of the sleeve having an angle bend and extending forwardly with the reverse bent end portions at the forward end of the sleeve and a plug fitted in the forward end of the sleeve in front of the eye of the hook and engaging the ends of the prongs of the cotter pin.

8. A fish lure having a fish hook with a stem and an eye combined with a sleeve surrounding the stem and eye of the hook, a connection between the eye and the sleeve and means secured to the sleeve for attaching a leader and a line, the means for securing the leader and the line including an eye with a connection to the sleeve located on the side of the sleeve having the prong of the hook and in substantial alignment therewith, the said eye being relatively close to the forward end of the sleeve.

RAY STEWART.
CHAS. S. FISH.